United States Patent [19]
Nagai et al.

[11] Patent Number: 4,754,339
[45] Date of Patent: Jun. 28, 1988

[54] INFORMATION RECORDING DISC PRE-RECORDED WITH ADDRESS AND PSEUDO ADDRESS SIGNALS

[75] Inventors: Tadao Nagai, Sagamiko; Hirohisa Yamaguchi, Tokyo; Akira Mashimo, Tokorozawa, all of Japan

[73] Assignee: Teac Corporation, Tokyo, Japan

[21] Appl. No.: 929,605

[22] Filed: Nov. 10, 1986

[30] Foreign Application Priority Data

Nov. 15, 1985 [JP] Japan ................. 60-255966

[51] Int. Cl.$^4$ ............ H04N 9/79; H04N 5/85; G11B 7/013
[52] U.S. Cl. ................ 358/310; 369/32; 369/275; 369/44; 358/342
[58] Field of Search ........... 369/275, 284, 286, 109, 369/44, 46, 32, 45; 346/76 L, 135.1; 358/310, 326

[56] References Cited

U.S. PATENT DOCUMENTS

| 4,094,013 | 6/1978 | Hill et al. | 369/32 |
| 4,190,859 | 2/1980 | Kinjo | 369/275 |
| 4,486,791 | 12/1984 | Wada et al. | 369/45 |
| 4,507,763 | 3/1985 | Kato | 369/44 |

FOREIGN PATENT DOCUMENTS

| 0178116 | 4/1986 | European Pat. Off. | 369/275 |
| 58-41446 | 3/1983 | Japan | 369/109 |
| 59-101043 | 6/1984 | Japan | 369/109 |
| 59-207039 | 11/1984 | Japan | 369/275 |

Primary Examiner—Raymond F. Cardillo
Assistant Examiner—Hoa T. Nguyen
Attorney, Agent, or Firm—Ladas & Parry

[57] ABSTRACT

An information recording disc comprises a guide track, an address signal recording portion arranged in each track turn of the guide track and pre-recorded with an address signal, and a pseudo address signal recording portion arranged in each track turn of the guide track adjacent a corresponding address signal recording portion provided in a track turn of the guide track adjacent thereto. The recording length of the pseudo address signal recording portion is selected approximately equal to the recording length of the corresponding address signal recording portion.

10 Claims, 4 Drawing Sheets

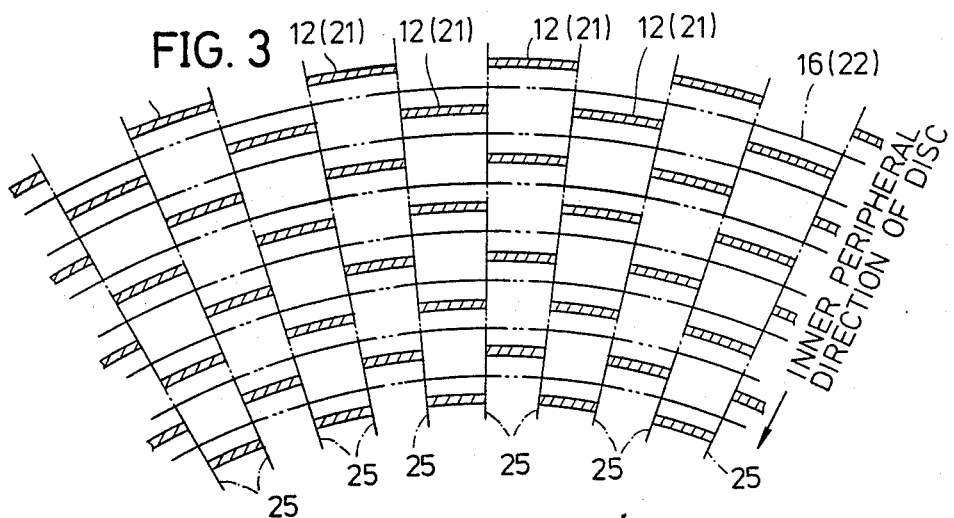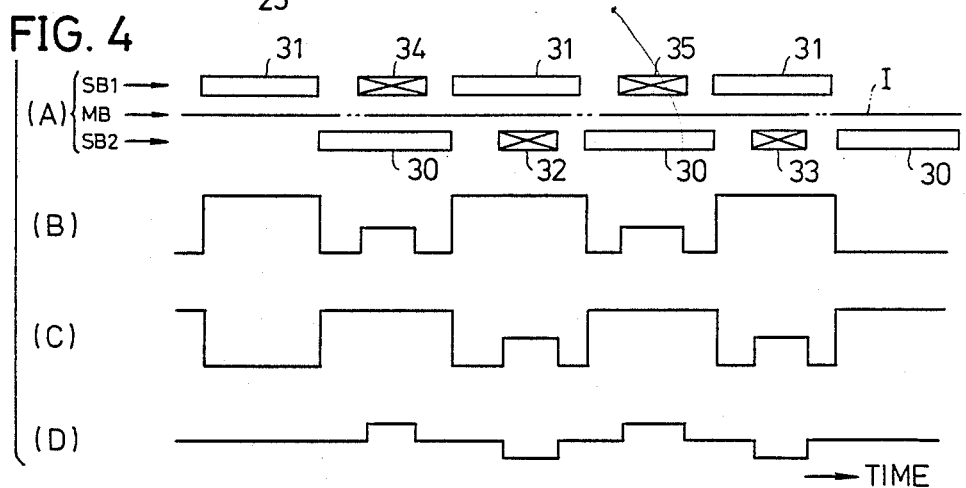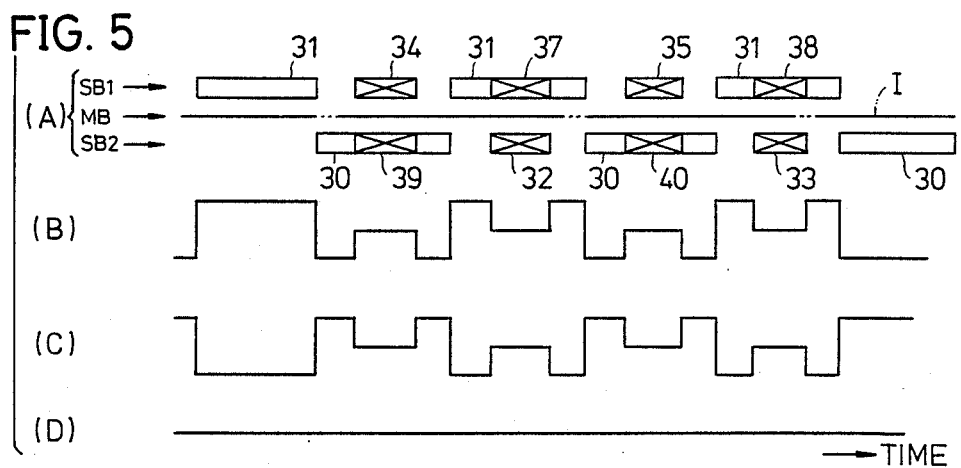

INFORMATION RECORDING DISC PRE-RECORDED WITH ADDRESS AND PSEUDO ADDRESS SIGNALS

BACKGROUND OF THE INVENTION

The present invention generally relates to information recording discs, and more particularly to an information recording disc having a guide track pre-formed thereon for determining a track position where an information signal is to be recorded and having an address signal pre-recorded on the guide track.

An information recording disc (hereinafter simply referred to as a disc) comprising a recording surface which is divided into a plurality of imaginary equiangular sectoral regions, where each track turn of the guide track is constituted by a row of pits formed in every other of the equiangular sectoral regions, each pit is only formed in one of two mutually adjacent track turns of the guide track in each of the equiangular sectoral regions so that the pits are formed in every other track turns of the guide track in a radial direction of the disc in each of the equiangular sectoral regions, and a track position where an information signal is to be recorded is located in a region between the two mutually adjacent track turns of the guide track was previously proposed in a U.S. patent application Ser. No. 873,407 filed June 12, 1986 in which the assignee is the same as the assignee of the present application. According to this disc, it is possible to obtain a tracking error signal from signals reproduced from the guide track by a main light beam. Hence, although a conventional disc having two continuous spiral guide tracks (grooves) located on both sides of an information signal recording track suffers a problem in that a trailing sub light beam is affected by pits of an information signal recorded by a main light beam at the time of the recording, it is possible to eliminate such a problem. In addition, by selecting a depth of the guide track to ¼ the wavelength of the main light beam which is used for recording and reproducing the information signal, it is possible to prevent diffraction in a reflected light from the guide track. For this reason, the tracking error signal will not be affected by diffracted light even when the main light beam traverses the guide track. As a result, an astigmatic focusing method can be used as a method of detecting a focal error, and the construction of an optical system in a recording and reproducing apparatus can be simplified compared to that of a recording and reproducing apparatus which is designed exclusively for playing a conventional disc having a single continuous spiral guide track.

However, no address signal is pre-recorded on the above described disc. Hence, when the recording of the information signal is once discontinued at a predetermined position on the recording surface of the disc and the recording is to be resumed after a predetermined time so as to newly record an information signal from the predetermined position where the previous recording had been discontinued, it is extremely difficult to find the predetermined position. Furthermore, even when an address signal is recorded together with the information signal at the time of the recording, the track position cannot be detected with a high accuracy at the time of the reproduction by use of such an address signal compared to the case where the address signal is pre-recorded on the disc, because signal dropout or the like may occur at the time of the recording.

Hence, a disc having a control signal such as an address signal pre-recorded on a guide track which is pre-formed on the disc independently of an information recording track was previously proposed in a U.S. patent application entitled "INFORMATION RECORDING DISC AND INFORMATION SIGNAL RECORDING APPARATUS THEREFOR" filed Oct. 9, 1986 Ser. No. 917,188 in which the assignee is the same as the assignee of the present application. Since the address signal is pre-recorded on the guide track in such a frequency band or recording interval that each information in the information signal which is to be recorded is unaffected by the address signal, it is possible to constantly detect the track position and the like during the recording mode in which the information signal is recorded. For example, the address signal is pre-recorded between two successive pits in each track turn of the guide track, and the same address information is recorded at two positions in each track turn of the guide track.

When a main light beam for recording and reproducing the information signal accurately scans a region between two mutually adjacent track turns of the guide track and first and second sub light beams for tracking respectively scan the two mutually adjacent track turns of the guide track of this second disc, a sum of signals reproduced from the two mutually adjacent track turns of the guide track by the first and second sub light beams should in principle become zero because the pits are formed in every other track turns of the guide track in each equiangular sectoral region and the recording lengths of the pits can be assumed to be the same in the two mutually adjacent track turns of the guide track. However, the recording length of an address signal recording portion between the two successive pits in each track turn of the guide track is selected to be within the vertical blanking period so as not to coincide with the recording interval of the information signal (for example, a frequency converted carrier chrominance signal which has been frequency-converted into a low frequency band) having a frequency band identical to that of the address signal and to avoid the interval of the color burst signal. For this reason, the recording length of the address signal recording portion in which the address signal is recorded is always shorter than the recording length (one horizontal scanning period) of the pit. As a result, due to the existence of the address signal recording portion, the sum of the signals reproduced from the two mutually adjacent track turns of the guide track by the first and second sub light beams does not become zero. Since a tracking control operation is carried out based on the two signals reproduced from the two mutually adjacent track turns of the guide track, there is a problem in that the tracking control operation becomes unstable according to this disc.

SUMMARY OF THE INVENTION

Accordingly, it is a general object of the present invention to provide a novel and useful information recording disc pre-recorded with an address signal, in which the problems described heretofore are eliminated.

Another and more specific object of the present invention is to provide an information recording disc comprising a guide track, an address signal recording portion arranged in each track turn of the guide track and pre-recorded with an address signal, and a pseudo address signal recording portion arranged in each track turn of the guide track adjacent to a corresponding address signal recording portion provided in a track turn of the guide track adjacent thereto, where the recording length of the pseudo address signal recording portion is selected approximately equal to the recording length of the corresponding address signal recording portion. According to the disc of the present invention, it is possible to constantly detect the track position at the time of the recording because the address signal is pre-recorded on the guide track. In addition, when first and second sub light beams simultaneously scan two mutually adjacent track turns of the guide track independently, a sum of signals reproduced from the two mutually adjacent track turns of the guide track by the first and second sub light beams becomes essentially zero since one of the first and second sub light beams reproduces the pseudo address signal while the other reproduces the address signal. Therefore, it is possible to carry out a stable tracking control based on the signals reproduced from the two mutually adjacent track turns of the guide track.

Other objects and further features of the present invention will be apparent from the following detailed description when read in conjunction with the accompanying drawings.

BRIEF DESCRIPTION OF THE DRAWINGS

FIG. 3 is an enlarged view showing an essential part of the track pattern of the discs shown in FIGS. 1 and 2;

FIGS. 4(A) through 4(D) are a view showing an essential part of a track pattern of another previously proposed disc to which the present invention may be applied and signal waveforms obtained by scanning a guide track of the disc;

FIGS. 5(A) through 5(D) are a view showing an essential part of a track pattern of an embodiment of the information recording disc according to the present invention and signal waveforms obtained by scanning a guide track of the disc;

DETAILED DESCRIPTION

Figure 1:
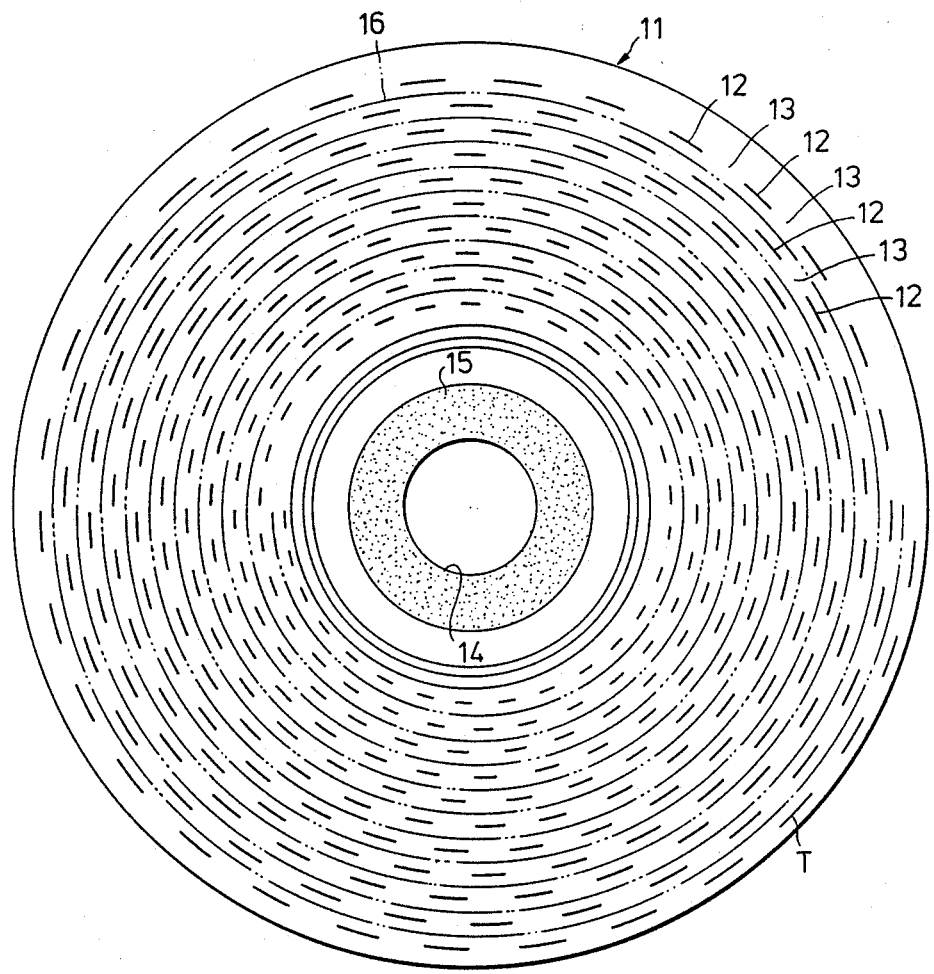
FIGS. 1 and 2 are plan views respectively showing track patterns of previously proposed discs to which the present invention may be applied.
Figure 2:
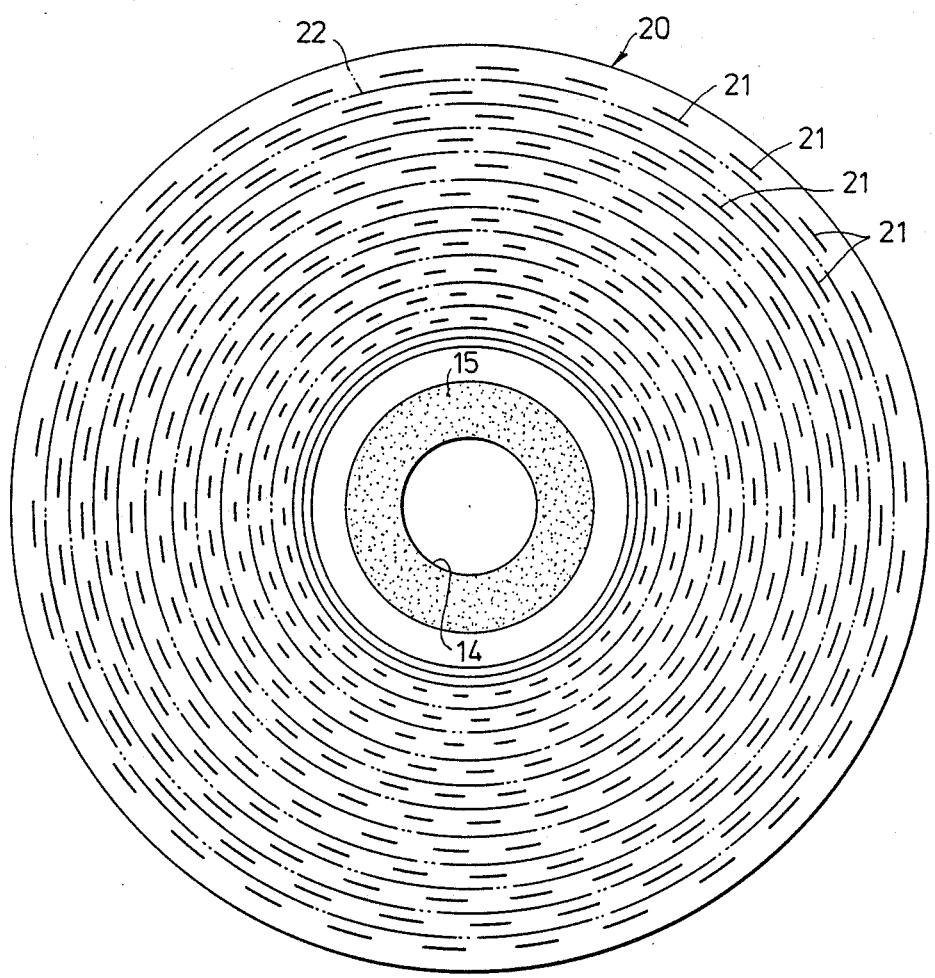

In order to facilitate the understanding of the present invention, description will first be given with respect to previously proposed discs to which the present invention may be applied. FIGS. 1 and 2 show track patterns of discs to which the present invention may be applied. The discs shown in FIGS. 1 and 2 were previously proposed in the U.S. patent application Ser. No. 873,407 in which the assignee is the same as the assignee of the present application.

FIG. 1 shows an information recording disc 11 having a diameter of 30 cm, for example, and a spiral guide track T is formed on a recording surface with a constant track pitch (for example, 1.6 microns) when the disc 11 is produced. The guide track T is made up of a plurality of consecutive guide track turns, and each guide track turn is constituted by an intermittent row of pits. In other words, a pre-formed pit 12 and a non-pit portion 13 are alternately formed repeatedly in each guide track turn. The pre-formed pits 12 are initially formed on the disc 11 before an information signal is first recorded thereon. That is, the pre-formed pits 12 are pre-formed on the disc 11 before the actual recording of the information signal. In the present specification, these pre-formed pits 12 will simply be referred to as pits 12.

The length of each pit 12 of the guide track T is selected to a value which is equal to a recording length of one horizontal scanning period (1H) of a video signal recorded on a constant angular velocity (CAV) system disc, for example. In addition, when a recording surface of the disc 11 is divided into a plurality of imaginary equiangular sectoral regions, the pit 12 is formed in only one of two consecutive guide track turns of the guide track T in each equiangular sectoral region so that the pits 12 are formed in every other guide track turns in a radial direction of the disc 11 in each equiangular sectoral region. Concretely speaking, the pits 12 will naturally be formed in this manner when the recording surface of the disc 11 is divided into an odd number of equiangular sectoral regions and the pits 12 are formed in every other equiangular sectoral regions in each guide track turn. For example, when the recording surface of the disc 11 is divided into 525 equiangular sectoral regions, one of two consecutive guide track turns comprises 262 pits 12 while the other of the two consecutive guide track turns comprises 263 pits 12.

A center hole 14 is formed at a center of the disc 11, and a label portion 15 is formed on the periphery of the center hole 14. An information signal including the video signal is recorded on and reproduced from an information signal recording track formed in a region between two consecutive guide track turns of the guide track T, by use of a main light beam. In FIG. 1, a center line of the information signal recording track is indicated by a two-dot chain line 16.

FIG. 2 shows another track pattern formed on the previously proposed disc. In FIG. 2, those parts which are the same as those corresponding parts in FIG. 1 are designated by the same reference numerals, and description thereof will be omitted. In FIG. 2, a plurality of concentric guide tracks are formed on a disc 20. In the present specification, these concentric guide tracks will also be referred to as a plurality of consecutive guide track turns making up the guide track. Pits 21 are intermittently formed in each of the concentric guide tracks. When a recording surface of the disc 20 is divided into a plurality of equiangular sectoral regions, the pit 21 is formed in only one of two mutually adjacent concentric guide tracks in each equiangular sectoral region so that the pits 21 are formed in every other concentric guide tracks in a radial direction of the disc 20 in each equiangular sectoral region. Concretely speaking, the pits 21 will naturally be formed in this manner when the recording surface of the disc 20 is divided into an even number of equiangular sectoral regions and the pits 21 are formed in every other equiangular sectoral regions in each concentric guide track, that is, in each guide track turn.

The information signal is recorded on and reproduced from an information signal recording track formed in a region between two mutually adjacent concentric guide tracks, by use of the main light beam. In FIG. 2, a center line of the information signal recording track is indicated by a two-dot chain line 22. According to the disc 20, a plurality of concentric information signal recording tracks are formed because the guide track is made up of the plurality of concentric tracks. In the present specification, these concentric information signal recording tracks will also be referred to as a plurality of consecutive information recording track turns making up the information signal recording track.

The discs 11 and 20 only differ in that the guide track of the disc 11 is made up of a spiral guide track and the guide track of the disc 20 is made up of a plurality of concentric guide tracks, and the configuration and recording arrangement of the pits 12 and 21 are the same. In other words, as shown on an enlarged scale in FIG. 3 which shows a part of the track pattern of the disc 11 (20), the start and end of each pit 12 (21) indicated by hatchings in one equiangular sectoral region respectively coincide with the end of the pit 12 (21) in one adjacent equiangular sectoral region and the start of the pit 12 (21) in another adjacent equiangular sectoral region. Boundary lines 25 indicated by one-dot chain lines connect the starts and ends of the pits 12 (21) in the radial direction of the disc 11 (20), and these boundary lines 25 define the equiangular sectoral regions.

The depth of the pit 12 (21) of the disc 11 (20) is selected to ¼ the wavelength λ of the main and sub light beams. Hence, a phase error λ/2 is introduced between the light reflected within the groove of the pit 12 (21) and the light reflected at a position other than the groove, and the light intensity is greatly attenuated in the case of the light reflected at the position other than the groove.

According to the previously proposed disc, it is possible to obtain a tracking error signal from signals reproduced from the guide track by the main light beam because the disc comprises a recording surface which is divided into a plurality of equiangular sectoral regions and a guide track formed on the recording surface, where each track turn of the guide track is constituted by a row of intermittent pits formed in every other equiangular sectoral regions, and the pit is only formed in one of two mutually adjacent track turns of the guide track in each equiangular sectoral region so that the pits are formed in every other track turns in a radial direction of the disc in each equiangular sectoral region. Hence, although the conventional disc having two continuous spiral guide tracks (grooves) located on both sides of an information signal recording track suffers a problem in that a trailing sub light beam is affected by the pits of the information signal recorded by a main light beam, it is possible to eliminate such a problem according to the previously proposed disc. Furthermore, it is possible to prevent diffraction in a reflected light beam from the guide track since the guide track has a depth of ¼ the wavelength λ of the main light beam for recording and reproducing the information signal. For this reason, the tracking error signal will not be affected by diffracted light even when the main light beam traverses the guide track. As a result, the astigmatic focusing method can be used as a method of detecting a focal error, and the construction of an optical system in a recording and reproducing apparatus can be simplified compared to that of the recording and reproducing apparatus which is designed exclusively for playing the conventional disc having a single continuous spiral guide track which is recorded with the information signal.

However, no address signal is pre-recorded on the above described discs 11 and 20. Hence, when the recording of the information signal is once discontinued at a predetermined position on the recording surface of the disc and the recording is to be resumed after a predetermined time so as to newly record an information signal from the predetermined position where the previous recording had been discontinued, it is extremely difficult to find the predetermined position. Furthermore, even when an address signal is recorded together with the information signal at the time of the recording, the track position cannot be detected with a high accuracy at the time of the reproduction by use of such an address signal compared to the case where the address signal is pre-recorded on the disc, because signal dropout or the like may occur at the time of the recording.

Hence, a disc having a control signal such as an address signal pre-recorded on a guide track which is pre-formed on the disc independently of an information recording track was previously proposed in a U.S. patent application entitled "INFORMATION RECORDING DISC AND INFORMATION SIGNAL RECORDING APPARATUS THEREFOR" filed Oct. 9, 1986 Ser. No. 917,188 in which the assignee is the same as the assignee of the present application. Description will now be given with respect to this other previously proposed disc. In FIG. 4(A), a two-dot chain line I indicates a center line of an information signal recording track which is to be formed on a CAV system disc which is rotated at a constant angular velocity, and corresponds to the two-dot chain lines 16 and 22 shown in FIGS. 1 and 2, respectively. Pre-formed pits 30 of a track turn of the guide track are formed for every other 1H on the lower side of the two-dot chain line I (that is, inner peripheral side of the disc), and pre-formed pits 31 of a track turn of the guide track are formed for every other 1H on the upper side of the two-dot chain line I (that is, outer peripheral side of the disc). As in the case of the previously proposed discs described before, the disc comprises a recording surface which is divided into a plurality of equiangular sectoral regions and a guide track formed on the recording surface, where each track turn of the guide track is constituted by a row of intermittent pits 30 (or 31) formed in every other equiangular sectoral regions, and the pit 30 (or 31) is only formed in one of two mutually adjacent track turns of the guide track in each equiangular sectoral region so that the pits 30 (or 31) are formed in every other track turns in a radial direction of the disc in each equiangular sectoral region.

In FIG. 4(A), portions 32 through 35 indicated with an "X" mark indicate address signal recording portions where an address signal is pre-recorded as an example of a control signal. In the track turn of the guide track on the inner peripheral side of the disc, the address signal recording portions 32 and 33 are respectively arranged between two successive pits 30. Similarly, in the track turn of the guide track on the outer peripheral side of the disc, the address signal recording portions 34 and 35 are respectively arranged between two successive pits 31. In other words, address signals containing identical address information are pre-recorded at two positions in each track turn of the guide track when the disc is produced, so as to enable an address error checking.

According to this disc, it is possible to accurately control the track position for every one revolution period (for example, one frame) of the disc, because the address signal is pre-recorded on the disc. In addition, it is possible to discontinue the recording of the information signal at an intermediate position on a recording surface of the disc and then continue the recording of a new information signal after a predetermined time has elapsed from the discontinuance, and also leave unrecorded (blank) track turns of the information signal recording track on the disc when recording the information signal during a first recording operation and record a different information signal on the unrecorded track turns of the information signal recording track during a second recording operation. In other words, it is possible to record information on the disc in a variety of methods and accordingly widen the application range of the disc.

When a main light beam MB for recording and reproducing the information signal accurately scans a region between two mutually adjacent track turns of the guide track and first and second sub light beams $SB_1$ and $SB_2$ for tracking respectively scan the two mutually adjacent track turns of the guide track of this disc as shown in FIG. 4(A), a signal shown in FIG. 4(B) is reproduced by scanning the pits 31 and the address signal recording portions 34 and 35 by the first sub light beam $SB_1$, and a signal shown in FIG. 4(C) is reproduced by scanning the pits 30 and the address signal recording portions 32 and 33 by the second sub light beam $SB_2$. A sum of signals reproduced from the two mutually adjacent track turns of the guide track by the first and second sub light beams $SB_1$ and $SB_2$ should in principle become zero because the pits 30 and 31 are formed in every other track turns of the guide track in each equiangular sectoral region and the recording lengths of the pits can be assumed to be the same in the two mutually adjacent track turns of the guide track.

However, as shown in FIG. 4(A), the recording length of the address signal recording portions 32 through 35 is selected to be within the vertical blanking period so as not to coincide with the recording interval of the information signal (for example, a frequency converted carrier chrominance signal which has been frequency-converted into a low frequency band) having a frequency band identical to that of the address signal and to avoid the interval of the color burst signal. For this reason, the recording length of the address signal recording portions 32 through 35 in which the address signal is recorded is always shorter than the recording length (one horizontal scanning period) of the pits 30 and 31. As a result, due to the existence of the address signal recording portions 32 through 35, the sum of the signals reproduced from the two mutually adjacent track turns of the guide track by the first and second sub light beams $SB_1$ and $SB_2$ does not become zero as may be seen from FIG. 4(D). As shown in FIG. 4(D), the sum becomes a positive or negative polarity pulse at positions corresponding to the address signal recording portions 32 through 35. Since a tracking control operation is carried out based on the two signals reproduced from the two mutually adjacent track turns of the guide track, there is a problem in that the tracking control operation becomes unstable according to this disc.

Next, description will be given with respect to an embodiment of the disc according to the present invention by referring to FIGS. 5 through 9. FIG. 5(A) schematically shows an essential part of the track pattern of the embodiment of the disc according to the present invention. In FIG. 5(A), those parts which are the same as those corresponding parts in FIG. 4(A) are designated by the same reference numerals, and description thereof will be omitted. In FIG. 5(A), the address signals recorded in the address signal recording portions 32 through 35 are respectively constituted by digital data having a signal format shown in FIG. 6. The address signal is modulated according to a predetermined modulation system such as the phase encoding (hereinafter simply referred to as PE) before being recorded on the disc.

Figure 6:
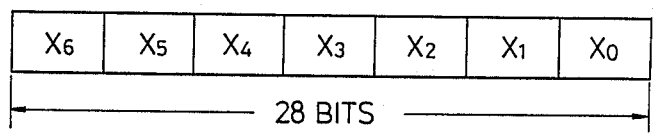
FIG. 6 shows an embodiment of a signal format of an address signal pre-recorded on the disc.

In FIG. 6, one address signal is constituted by seven words $X_6$ through $X_0$, and the words $X_6$ through $X_0$ are recorded and reproduced in the sequence of the words $X_6 \rightarrow X_5 \rightarrow \ldots \rightarrow X_1 \rightarrow X_0$. One word comprises four bits, and the address signal as a whole therefore comprises twenty-eight bits. The word $X_6$ comprises start bits indicating a value "F" in hexadecimal (that is, a value "1111" in decimal), for example, and the word $X_5$ comprises disc information bits. The words $X_4$ through $X_0$ comprise track address bits containing the track address. The track address bits indicate the number of track turns from an innermost peripheral position, on the disc when it is assumed that one track turn is counted for each revolution of the disc. The words $X_4$, $X_3$, $X_2$, $X_1$ and $X_0$ indicate the values in the ten thousands digit, thousands digit, hundreds digit, tens digit and ones digit, respectively. Accordingly, a maximum of 99,999 track turns may be described by the words $X_4$ through $X_0$.

Figure 7:
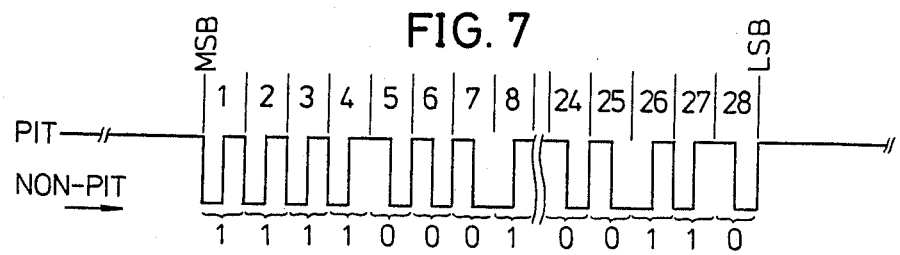
FIG. 7 shows an example of a signal waveform of the address signal.

FIG. 7 shows an example of the signal waveform of one address signal. Upper four bits including a most significant bit (MSB) corresponds to the word $X_6$, and in FIG. 7, the values of data are shown below the signal waveform. In FIG. 5(A), the address signal is reproduced from the address signal recording portions 32 through 35 in the sequence of the address signal recording portions 34→32→35→33. The address signals reproduced from the address signal recording portions 34 and 35 are discriminated as address signals reproduced from an odd numbered track turn of the guide track and the address signals reproduced from the address signal recording portions 32 and 33 are discriminated as address signals reproduced from an even numbered track turn of the guide track, because the values of the address signals are preset so that it is possible to discriminate the address signals reproduced from the odd and even numbered track turns of the guide track.

For example, an information signal comprising a color video signal and two channels of audio signals are recorded on and reproduced from track turns of the information signal recording track. The color video signal is separated into a luminance signal and a carrier chrominance signal, and the separated luminance signal is frequency-modulated into a frequency modulated (FM) luminance signal having a carrier deviation band of 5.6 MHz to 7.0 MHz, for example, as indicated by a solid line II in FIG. 8. The separated carrier chrominance signal is frequency-converted into a frequency band lower than the frequency band of the FM luminance signal and is converted into a frequency converted carrier chrominance signal having a carrier frequency of approximately 743 kHz as indicated by a solid line III. The two channels of audio signals are independently frequency-modulated into FM audio signals having carrier frequencies of 1.5 MHz and 1.8 MHz, respectively, as indicated by solid lines IV and V. The FM luminance signal, the frequency converted carrier chrominance signal and the FM audio signals are frequency-division-multiplexed into a frequency division multiplexed signal, and the frequency division multiplexed signal is recorded on the track turns of the information signal recording track.

On the other hand, the address signal is modulated according to the PE, for example, before being recorded on the disc. For example, a maximum frequency of the modulated address signal is approximately 818 kHz which is fifty-two times the horizontal scanning frequency, and a minimum frequency of the modulated address signal is approximately 409 kHz which is twenty-six times the horizontal scanning frequency. In other words, the modulated address signal has a frequency spectrum indicated by a phantom line VI in FIG. 8. In order to minimize the undesirable effects of the modulated address signal on the FM audio signals, the maximum and minimum frequencies of the modulated address signal are selected so that a valley portion of the frequency spectrum VI is located at the carrier frequencies of the FM audio signals.

Figure 8:
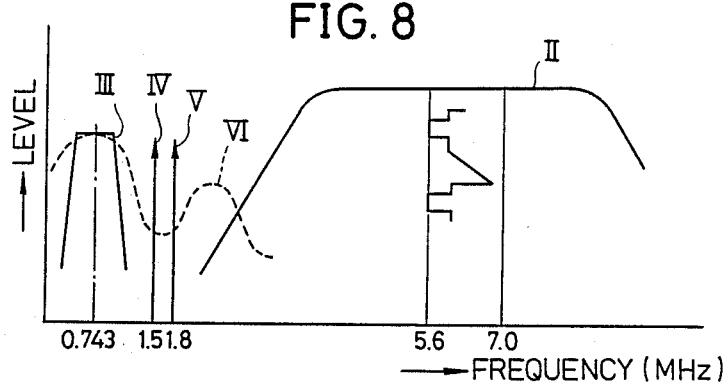
FIG. 8 shows frequency spectrums of an information signal and an address signal which are recorded on the disc.

As a result, the frequency spectrum VI of the modulated address signal overlaps the frequency band III of the frequency converted carrier chrominance signal as shown in FIG. 8, and the frequency converted carrier chrominance signal and the modulated address signal cannot be recorded simultaneously. For this reason, it is necessary to record the frequency converted carrier chrominance signal and the modulated signal at mutually different positions on the time base. As is well known, the frequency converted carrier chrominance signal including the color burst signal is not transmitted during the horizontal blanking period excluding the back porch nor during a specific time period within the vertical blanking period. Hence, in the disc according to the present invention, the address signal recording portions 32 through 35 are pre-formed at the time of the production of the disc so that each address signal recording portion is located at a specific position within the vertical blanking period avoiding the time period of the color burst signal.

When recording on the disc the frequency division multiplexed signal of the FM luminance signal, the frequency converted carrier chrominance signal and the FM audio signals, a jitter occurs due to the eccentricity and the like of the disc. As will be described later on in the present specification, the rotation of the disc is controlled during the recording and reproduction of the information signal (frequency division multiplexed signal) so that edges of pulses reproduced from the pits 30 and 31 become locked to the horizontal synchronizing signal within the information signal. In this case, the phase of the color burst signal with respect to the address signal becomes relatively advanced or retarded due to the jitter. For this reason, the recording interval and the recording position of the address signal recording portions 32 through 35 are selected so that the color burst signal within the vertical blanking period becomes positioned approximately at the center portion of a time interval between mutually adjacent address signals within the reproduced pulses reproduced from the pits of the guide track on the disc.

In FIG. 5(A), at the positions of the pits 31 in the track turn of the guide track adjacent to the track turn having the address signal recording portions 32 and 33, pseudo address signal recording portions 37 and 38 are provided. Pseudo address signals are recorded in the pseudo address signal recording portions 37 and 38, and the recording lengths of the pseudo address signal recording portions 37 and 38 are approximately the same as the recording lengths of the corresponding address signal recording portions 32 and 33 adjacent thereto. Similarly, at the positions of the pits 30 in the track turn of the guide track adjacent to the track turn having the address signal recording portions 34 and 35, pseudo address signal recording portions 39 and 40 are provided. The recording lengths of the pseudo address signal recording portions 39 and 40 are approximately the same as the recording lengths of the corresponding address signal recording portions 34 and 35 adjacent thereto.

The pseudo address signals have a signal format similar to that of the address signal shown in FIG. 6, and the value of the pseudo address signal recorded in a pseudo address signal recording portion is selected to an inverted value of the address signal recorded in a corresponding address signal recording portion adjacent thereto. The address signal is recorded between two successive pits in each track turn of the guide track and a non-pit (or non-groove) portion is formed in a first half of the bit and a pit portion (or groove portion) having the depth $\lambda/4$ is formed in a latter half of the bit in the case where the data is "1". On the other hand, the pseudo address- signal is recorded within the pit. For this reason, it will be impossible to discriminate the pseudo address signals from the pits in one track turn of the guide track unless the pseudo address signal is recorded as a non-pit portion at the position where the corresponding address signal is recorded as a pit portion in a track turn of the guide track adjacent to the one track turn. This is the reason why the value of the pseudo address signal is selected to the inverted value of the address signal. The recording depths of the pits 30 and 31 are $\lambda/4$ for the entire recording lengths thereof. But the depths of the pseudo address signals are $\lambda/4$ in the pit portions excluding the pseudo address signal recording portions 37 through 40 and are $\lambda/4$ or zero (non-pit) within the pseudo address signal recording portions 37 through 40 depending on the address value.

As shown in FIG. 5(A), the main light beam MB scans along the center line indicated by the two-dot chain line I where the information signal recording track is to be formed or has been formed. On the other hand, the first and second sub light beams $SB_1$ and $SB_2$ are irradiated on the disc at positions which respectively trail and lead a position irradiated by the main light beam MB in the scanning direction and are mutually deviated in the direction of the width of the information signal recording track. When the first and second sub light beams $SB_1$ and $SB_2$ simultaneously scan two mutually adjacent track turns of the guide track independently, a signal shown in FIG. 5(B) is reproduced from one of the two mutually adjacent track turns by the first sub light beam $SB_1$ and a signal shown in FIG. 5(C) is reproduced from the other of the two mutually adjacent track turns by the second sub light beam $SB_2$. The intensities of the reflected light beams are sufficiently small when the first and second sub light beams $SB_1$ and $SB_2$ scan the respective pits 31 and 30, and the levels of the reproduced signals become high as may be seen from FIGS. 5(B) and 5(C). On the other hand, the intensities of the reflected light beams are sufficiently high when the first and second sub light beams $SB_1$ and $SB_2$ scan the non-pit portions where the respective pits 31 and 30 do not exist, and the levels of the reproduced signals become low. As described before, the pit portions having lengths which are sufficiently small compared to the lengths of the pits 30 and 31 are intermittently formed within the address signal recording portions 32 through 35 and within the pseudo address signal recording portions 37 through 40 depending on the data value. Hence, when the first and second sub light beams SB$_1$ and SB$_2$ scan the corresponding address signal recording portions or pseudo address signal recording portions, the reproduced signals after being integrated have an intermediate level between the high and low levels as shown in FIGS. 5(B) and 5(C).

Figure 9:
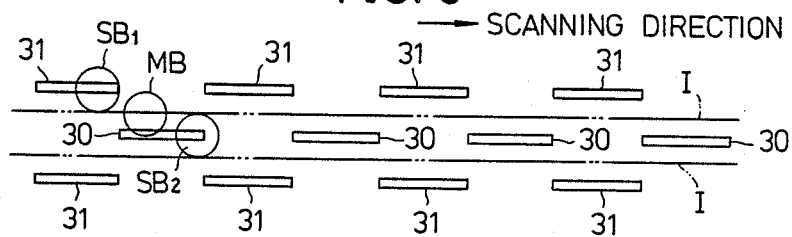
FIG. 9 shows the relationship of scanning positions of a main light beam and first and second sub light beams.

As shown in FIG. 9, the first and second sub light beams SB$_1$ and SB$_2$ irradiate positions on the disc which are mutually deviated in the scanning direction. As a result, there is actually a relative phase error between the signals reproduced by the first and second sub light beams SB$_1$ and SB$_2$. However, the phase error (for example, 2 microseconds at the maximum) is considerably small compared to one horizontal scanning period, and this extremely small phase error can be neglected from the practical point of view. In FIG. 9, the illustration of the address signal recording portions and the pseudo address signal recording portions is omitted. Further, in actual practice, the main and sub light beams MB, SB$_1$ and SB$_2$ are extremely close to each other, but FIG. 9 shows the relationship of the pits 30 and 31 and the main and sub light beams SB$_1$ and SB$_2$ in an exaggerated manner for convenience' sake.

As shown in FIGS. 5(B) and 5(C), average levels of the signals reproduced by the first and second sub light beams SB$_1$ and SB$_2$ are approximately the same, because one sub light beam scans the pseudo address signal recording portion while the other sub light beam scans the address signal recording portion. In addition, the signals reproduced by the first and second sub light beams SB$_1$ and SB$_2$ have mutually opposite polarities, because one sub light beam scans the non-pit portion when the other sub light beam scans the pit portion. Accordingly, when the two signals reproduced by the first and second sub light beams SB$_1$ and SB$_2$ are added, an added signal shown in FIG. 5(D) has a constant level when the main light beam MB correctly scans the center line I of the information signal recording track. Therefore, a stable tracking control operation can be carried out based on the signals reproduced by the first and second sub light beams SB$_1$ and SB$_2$.

The present invention is not limited to the embodiment described heretofore, and for example, the pseudo address signal may be recorded between two successive pits of each track turn of the guide track and the address signal may be recorded within the pit. The information signal which is recorded on the disc may be digital audio data and the like having a frequency band different from that of the address signal.

Further, the present invention is not limited to these embodiments, but various variations and modifications may be made without departing from the scope of the present invention.

What is claimed is:

1. An information recording disc comprising:
   a recording surface; and
   a guide track formed on said recording surface at a position different from a track position of an information signal which is to be recorded, said guide track comprising a spiral guide track or concentric guide tracks,
   said guide track being an inverted valve of said address signal and being pre-recorded with an address signal which has a frequency band different from a frequency band of the information signal which is to be recorded and indicates a track position on said recording surface and a pseudo address signal,
   said pseudo address signal being pre-recorded in each track turn of said guide track adjacent to a corresponding address signal pre-recorded in a track turn of the guide track adjacent thereto with a recording length which is approximately equal to a recording lengt of the corresponding address signal.

2. An information recording disc as claimed in claim 1 in which said recording surface is divided into a plurality of imaginary equiangular sectoral regions, each track turn of said guide track being constituted by a row of pits formed in every other of said equiangular sectoral regions, said pits being only formed in one of two mutually adjacent track turns of said guide track in each of said equiangular sectoral regions so that the pits are formed in every other track turns of said guide track in a radial direction of the information recording disc in each of said equiangular sectoral regions, said track position where said information signal is to be recorded being located in a region between said two mutually adjacent track turns of said guide track, said pits having a recording length which is larger than recording lengths of said address signal and said pseudo address signal.

3. An information recording disc as claimed in claim 2 in which said address signal is pre-recorded between two successive pits along a longitudinal direction of each track turn of said guide track, and said pseudo address signal is pre-recorded within a pit in each track turn of said guide track adjacent to the corresponding address signal pre-recorded in a track turn of said guide track adjacent thereto.

4. An information recording disc as claimed in claim 2 in which said address signal is pre-recorded within a pit in each track turn of said guide track, and said pseudo address signal is pre-recorded between two successive pits along a longitudinal direction of each track turn of said guide track adjacent to the corresponding address signal pre-recorded in a track turn of said guide track adjacent thereto.

5. An information recording disc comprising:
   a recording surface; and
   a guide track formed on said recording surface at a position different from a track position of an information signal which is to be recorded, said guide track comprising a spiral guide track or concentric guide tracks,
   said guide track being pre-recorded with an address signal in a recording interval having a different time position from a recording interval of the information signal which is to be recorded and indicates a track position on said recording surface and a pseudo address signal,
   said pseudo address signal being an inverted valve of said address signal and being pre-recorded in each track turn of said guide track adjacent to a corresponding address signal pre-recorded in a track turn of the guide track adjacent thereto with a recording length approximately equal to a recording length of the corresponding address signal.

6. An information recording disc as claimed in claim 5 in which said recording surface is divided into a plurality of imaginary equiangular sectoral regions, each track turn of said guide track being constituted by a row of pits formed in every other of said equiangular sectoral regions, said pits being only formed in one of two mutually adjacent track turns of said guide track in each of said equiangular sectoral regions so that the pits are formed in every other track turns of said guide track in a radial direction of the information recording disc in each of said equiangular sectoral regions, said track position where said information signal is to be recorded being located in a region between said two mutually adjacent track turns of said guide track, said pits having a recording length which is larger than recording lengths of said address signal and said pseudo address signal.

7. An information recording disc as claimed in claim 6 in which said address signal is pre-recorded between two successive pits along a longitudinal direction of each track turn of said guide track, and said pseudo address signal is pre-recorded within a pit in each track turn of said guide track adjacent to the corresponding address signal pre-recorded in a track turn of said guide track adjacent thereto.

8. An information recording disc as claimed in claim 6 in which said address signal is pre-recorded within a pit in each track turn of said guide track, and said pseudo address signal is pre-recorded between two successive pits along a longitudinal direction of each track turn of said guide track adjacent to the corresponding address signal pre-recorded in a track turn of said guide track adjacent thereto.

9. An information recording disc as claimed in claim 5 in which a first track turn out of said two mutually adjacent track turns of said guide track comprises a first address signal recording portion in which said address signal is pre-recorded and a second track turn out of said two mutually adjacent track turns of said guide track comprises a second address signal recording portion in which said address signal is pre-recorded, said first and second recording portions being provided at such positions that a recording position of a color burst signal of a composite video signal within said information signal which is to be recorded is located approximately at a center of an interval between a terminal position of said first address signal recording portion and a starting position of said second address signal recording portion, said first track turn comprising a first pseudo address signal recording portion in which said pseudo address signal is pre-recorded approximately side by side with said second address signal recording portion in a radial direction of the information recording disc, said second track turn comprising a second pseudo address signal recording portion in which said pseudo address signal is pre-recorded approximately side by side with said first address signal recording portion in said radial direction.

10. An information recording disc as claimed in claim 9 in which said first and second address signal recording portions and said first and second pseudo address signal recording portions are respectively provided at a plurality of locations in a corresponding one of said two mutually adjacent track turns of said guide track.

* * * * *